United States Patent
Kajiwara et al.

(10) Patent No.: US 11,250,574 B2
(45) Date of Patent: Feb. 15, 2022

(54) SENSOR SYSTEM

(71) Applicant: AISIN SEIKI KABUSHIKI KAISHA, Kariya (JP)

(72) Inventors: Kozo Kajiwara, Kariya (JP); Takeshi Fujita, Kariya (JP)

(73) Assignee: AISIN SEIKI KABUSHIKI KAISH, Kariya (JP)

( * ) Notice: Subject to any disclaimer, the term of this patent is extended or adjusted under 35 U.S.C. 154(b) by 0 days.

(21) Appl. No.: 16/952,715

(22) Filed: Nov. 19, 2020

(65) Prior Publication Data

US 2021/0158538 A1    May 27, 2021

(30) Foreign Application Priority Data

Nov. 21, 2019  (JP) .............................. JP2019-210739

(51) Int. Cl.
| | |
|---|---|
| *G06T 7/20* | (2017.01) |
| *G06K 9/00* | (2006.01) |
| *G06T 5/50* | (2006.01) |
| *H04N 5/232* | (2006.01) |

(52) U.S. Cl.
CPC ............ *G06T 7/20* (2013.01); *G06K 9/00342* (2013.01); *G06K 9/00711* (2013.01); *G06T 5/50* (2013.01); *H04N 5/232* (2013.01)

(58) Field of Classification Search
None
See application file for complete search history.

(56) References Cited

U.S. PATENT DOCUMENTS

| | | | |
|---|---|---|---|
| 8,400,329 | B2 | 3/2013 | Kumagami |
| 10,096,091 | B2 | 10/2018 | Lee et al. |
| 2017/0278221 | A1* | 9/2017 | Ji ............................. G06T 7/80 |
| 2020/0011668 | A1* | 1/2020 | Derhy .................. G01C 21/206 |

FOREIGN PATENT DOCUMENTS

| | | |
|---|---|---|
| JP | 5-091403 A | 4/1993 |
| JP | 2011-039983 A | 2/2011 |
| JP | 2017-017615 A | 1/2017 |
| JP | 2017-091518 A | 5/2017 |

* cited by examiner

*Primary Examiner* — Quan Pham
(74) *Attorney, Agent, or Firm* — Sughrue Mion, PLLC

(57) ABSTRACT

A sensor system includes: a transmission device that includes a sensor which asynchronously outputs detection data including time series information; and a reception device connected to the transmission device via a transmission line. The detection data includes coordinate information, and the transmission device includes an expansion unit configured to expand a value of the coordinate information within a range of the number of bits assigned to the coordinate information, in a case where the detection data is acquired from the sensor, and a transmission unit configured to transmit expanded detection data in which the value of the coordinate information is expanded by the expansion unit to the reception device via the transmission line.

5 Claims, 10 Drawing Sheets

| DATA ARRANGEMENT | TIME SERIES INFORMATION | CHANGE INFORMATION | COORDINATE INFORMATION | |
|---|---|---|---|---|
| | | | Y COORDINATE INFORMATION | X COORDINATE INFORMATION |
| NUMBER OF ASSIGNED BITS | MOST SIGNIFICANT(MSB) ← | | → LEAST SIGNIFICANT(LSB) | |
| | 32 BITS | 4 BITS | 14 BITS | 14 BITS |

| DIRECTION OF CHANGE IN PIXEL VALUE | VALUE OF CHANGE INFORMATION | CONTENTS OF CONVERSION PROCESSING |
|---|---|---|
| INCREASE | 1 | CONVERT INTO RANDOM VALUE (1 TO 15) WITHIN 4 BITS |
| DECREASE | 0 | 0 (NO CONVERSION) |

*FIG.8*

| IDENTIFICATION NUMBER | ARRANGEMENT PATTERN | | | |
|---|---|---|---|---|
| A | TIME SERIES INFORMATION | X COORDINATE INFORMATION | CHANGE INFORMATION | Y COORDINATE INFORMATION |
| B | TIME SERIES INFORMATION | CHANGE INFORMATION | X COORDINATE INFORMATION | Y COORDINATE INFORMATION |
| C | X COORDINATE INFORMATION | Y COORDINATE INFORMATION | TIME SERIES INFORMATION | CHANGE INFORMATION |
| D | X COORDINATE INFORMATION | CHANGE INFORMATION | Y COORDINATE INFORMATION | TIME SERIES INFORMATION |
| E | Y COORDINATE INFORMATION | TIME SERIES INFORMATION | X COORDINATE INFORMATION | CHANGE INFORMATION |
| F | Y COORDINATE INFORMATION | X COORDINATE INFORMATION | CHANGE INFORMATION | TIME SERIES INFORMATION |
| G | CHANGE INFORMATION | TIME SERIES INFORMATION | Y COORDINATE INFORMATION | X COORDINATE INFORMATION |
| H | CHANGE INFORMATION | Y COORDINATE INFORMATION | TIME SERIES INFORMATION | X COORDINATE INFORMATION |

*FIG.9*

| IDENTIFICATION NUMBER | SWITCHING PATTERN |
|---|---|
| 1 | A → B → C → D → E → F → G → H |
| 2 | B → A → D → C → H → G → F → E |
| 3 | C → G → H → D → F → E → A → B |
| 4 | D → F → B → H → C → A → G → E |
| 5 | E → F → A → C → B → H → D → G |
| 6 | F → G → A → H → D → B → E → C |
| 7 | G → B → E → D → C → F → H → A |
| 8 | H → D → F → G → E → A → C → B |

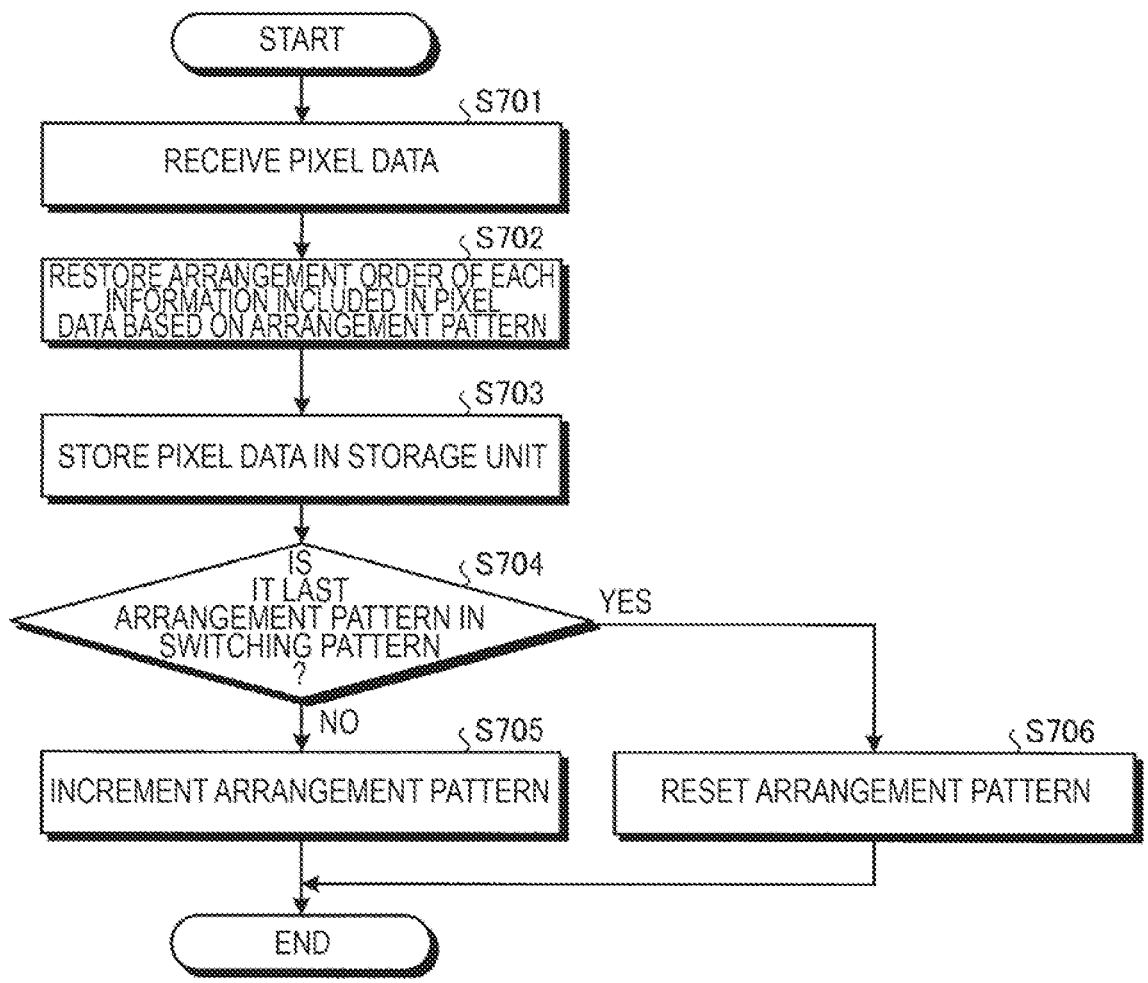

SENSOR SYSTEM

CROSS REFERENCE TO RELATED APPLICATIONS

This application is based on and claims priority under 35 U.S.C. § 119 to Japanese Patent Application 2019-210739, filed on Nov. 21, 2019, the entire content of which is incorporated herein by reference.

TECHNICAL FIELD

This disclosure relates to a sensor system.

BACKGROUND DISCUSSION

An event camera (event based camera) is known as a type of image sensor. The event camera captures the change in the pixel value (luminance value) of each pixel as an event, and generates to output pixel data including the time when the change occurs, the coordinates of the pixel where the change occurred, and the change value of the pixel (two values of increase or decrease).

According to such an event camera, since fragmentary information of only the changed pixels is transmitted, for example, it is difficult to grasp the entire data even in a case where an unauthorized access is received from the outside, and the security is high, compared to a camera in the related art that captures a frame image.

An example of the related art includes JP 2017-091518A.

However, for example, in a case where some feature (regularity, and the like) is found in the fragmentary information output from the event camera, the entire data may be estimated by a third party or the like who performs unauthorized access or the like.

As described above, there is room for further improvement in the above-described related art in terms of improving security.

Such a problem is not limited to the event camera, and is a problem common to all sensor systems having a sensor that asynchronously outputs detection data including time series information.

A need thus exists for a sensor system which is not susceptible to the drawback mentioned above.

SUMMARY

A sensor system according to an aspect of the present disclosure includes a transmission device and a reception device as an example. The transmission device includes a sensor that asynchronously outputs detection data including time series information. The reception device is connected to the transmission device via a transmission line. In addition, the detection data includes coordinate information. In addition, the transmission device is provided with an expansion unit and a transmission unit. The expansion unit is configured to expand a value of the coordinate information within a range of the number of bits assigned to the coordinate information, in a case where the detection data is acquired from the sensor. The transmission unit is configured to transmit expanded detection data in which the value of the coordinate information is expanded by the expansion unit to the reception device via the transmission line.

BRIEF DESCRIPTION OF THE DRAWINGS

The foregoing and additional features and characteristics of this disclosure will become more apparent from the following detailed description considered with the reference to the accompanying drawings, wherein:

FIG. 8 is a table illustrating an example of arrangement pattern information;

FIG. 9 is a table illustrating an example of a switching pattern;

FIG. 14 is a flowchart illustrating an example of a procedure of restoration processing corresponding to the arrangement change processing;

FIG. 15 is a table illustrating an example of transmission pattern information;

DETAILED DESCRIPTION

Figure 1:
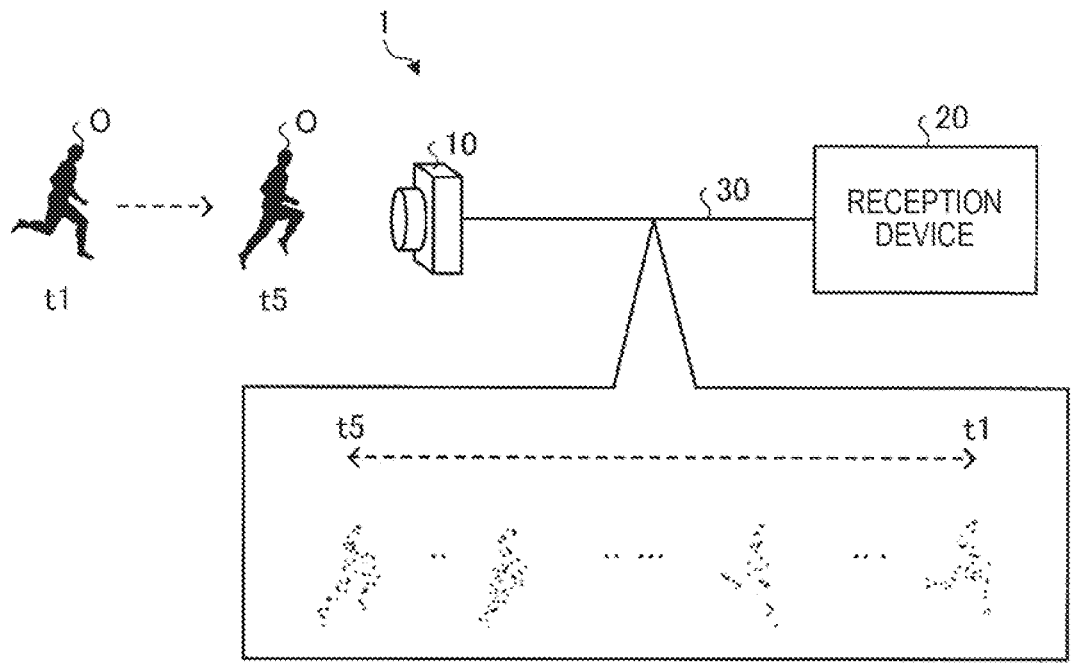
FIG. 1 is a diagram illustrating a schematic configuration of a sensor system according to an embodiment.

Hereinafter, embodiments for implementing a sensor system according to the present disclosure (hereinafter, referred to as "embodiments") will be described in detail with reference to the drawings. The embodiment does not limit the sensor system according to the present disclosure. In addition, in each of the following embodiments, the same parts are designated by the same reference numerals, and duplicate description is omitted.

1. Outline of Sensor System

First, a configuration of a sensor system 1 according to an embodiment will be described with reference to FIG. 1. FIG. 1 is a diagram illustrating a schematic configuration of the sensor system 1 according to the embodiment.

As illustrated in FIG. 1, the sensor system 1 according to the embodiment is provided with an imaging device 10 (an example of a transmission device), a reception device 20, and a transmission line 30.

The imaging device 10 images a subject O using an image sensor called an event driven sensor (event-based sensor). The event driven sensor is an image sensor that detects and outputs a change in a pixel value (luminance value). Specifically, in a case where the event driven sensor detects the change in the pixel value, the event driven sensor generates and outputs pixel data including the time when the pixel value changes, the coordinates of the changed pixel, and the amount of change in the pixel value.

FIG. 1 schematically illustrates an example of data (pixel data) transmitted from the imaging device 10 to the reception device 20, in a case where a running subject O is imaged by the imaging device 10 between the time t1 and the time t5. As described above, according to the event driven sensor, fragmentary information of only the changed pixel is transmitted. Therefore, unlike an image sensor in the related art that outputs data in frame units such as a charge coupled device (CCD) sensor and a complementary MOS (CMOS) sensor, it is difficult to grasp the entire data even in a case where an unauthorized access is received from the outside, and the security is high.

In addition, since the event driven sensor outputs data triggered by a change in the pixel value, the data transmission timing is asynchronous. In this respect as well, it can be said that the security is higher than that of the image sensor in the related art that outputs data based on a synchronization signal.

However, in a case where some feature (regularity) is found in the fragmentary information output from the event driven sensor, the entire data (image) may be estimated by a third party or the like who performs unauthorized access or the like. In addition, the image may be estimated by a side channel attack or the like.

Therefore, in the sensor system 1 according to the embodiment, among each information included in the pixel data output from the event driven sensor, by expanding the range of the value of the coordinate information, it was decided to eliminate the feature of pixel data that "there is a bit that normally takes a specific value (0)" (expansion processing).

In addition, in the sensor system 1 according to the embodiment, among each information included in the pixel data output from the event driven sensor, regarding the change information of the pixel value represented by the binary values of 0 and 1, in a case where the value of the change information is 1, by converting the value to another value, it is decided to eliminate the feature of pixel data that "a specific bit normally takes the binary values (0 or 1)" (conversion processing).

In addition, in the sensor system 1 according to the embodiment, by changing the arrangement of each information included in the pixel data output from the event driven sensor, it is decided to eliminate the feature of pixel data that "each information contained in the pixel data is normally arranged in the same order" (arrangement change processing).

In addition, in the sensor system 1 according to the embodiment, by accumulating a plurality of pieces of pixel data in the imaging device 10 and transmitting the accumulated plurality of pieces of pixel data to the reception device 20 in an order different from the time series order, it is decided to eliminate the feature of pixel data that "the transmission order of pixel data matches the time series order" (transmission order change processing).

As described above, the sensor system 1 according to the embodiment can make it difficult to estimate the entire data (image), even in a case where an unauthorized access is received from the outside by eliminating the feature of the pixel data. Therefore, according to the sensor system 1 according to the embodiment, it is possible to improve the security against unauthorized access to the transmission line 30 and a storage region (storage unit 23 described later).

In addition, according to the sensor system 1 according to the embodiment, security can be easily enhanced without additional cost such as an encryption element.

In addition, according to the sensor system 1 according to the embodiment, in a case where the pixel data output from the event driven sensor is used for image recognition processing, it is possible to make it more difficult to identify the individual. Therefore, for example, it is possible to easily clear the conditions of the personal information protection-related rules at no additional cost.

2. Functional Configuration of Sensor System

Figure 2:
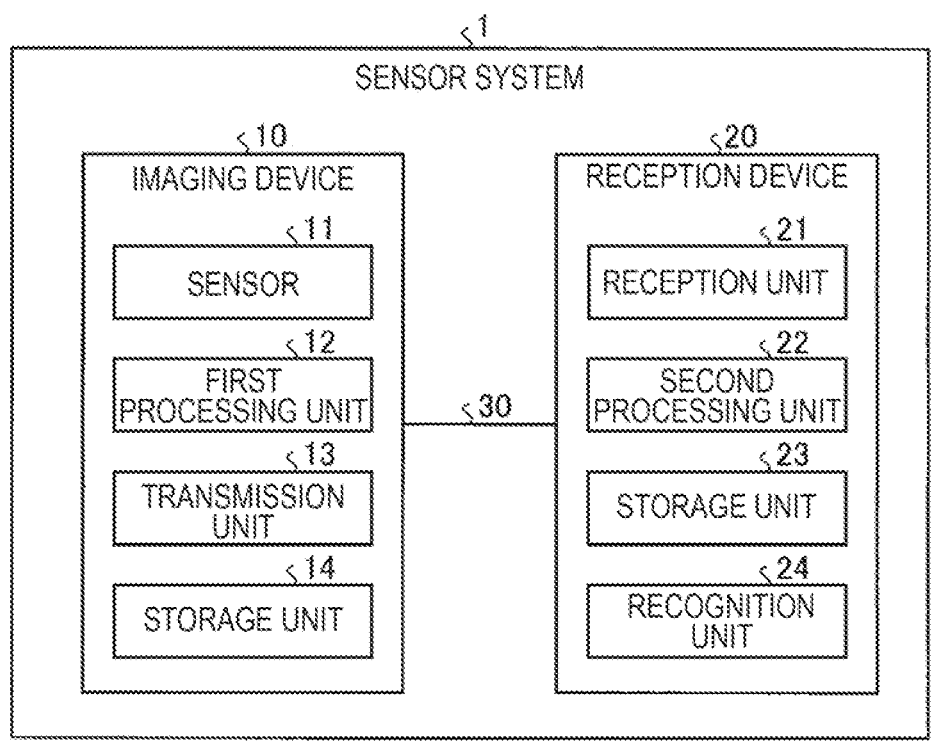
FIG. 2 is a block diagram illustrating a functional configuration of the sensor system according to the embodiment.

Next, a functional configuration of the sensor system 1 according to the embodiment will be described with reference to FIG. 2. FIG. 2 is a block diagram illustrating a functional configuration of the sensor system 1 according to the embodiment.

As illustrated in FIG. 2, the sensor system 1 according to the embodiment is provided with the imaging device 10, the reception device 20, and the transmission line 30. The transmission line 30 is a physical wiring such as a communication cable.

The imaging device 10 is provided with a sensor 11, a first processing unit 12, a transmission unit 13, and a storage unit 14.

The sensor 11 is the event driven sensor described above. In a case where the pixel value changes, the sensor 11 generates pixel data including time series information, coordinate information, and change information in the pixel value.

Figures 3, 4:
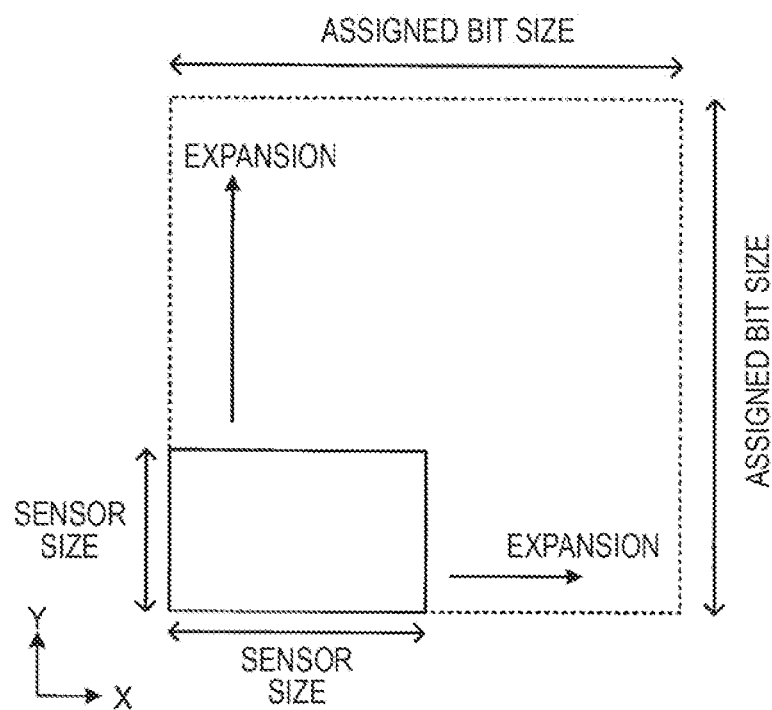
FIG. 3 is a table illustrating a configuration example of pixel data.
FIG. 4 is a diagram illustrating an example of expansion processing.

Here, the contents of the pixel data generated by the sensor 11 will be described with reference to FIG. 3. FIG. 3 is a table illustrating a configuration example of pixel data.

As illustrated in FIG. 3, the pixel data includes time series information and change information. In addition, the pixel data includes Y coordinate information and X coordinate information as coordinate information.

The time series information is information indicating the time when the change in the pixel value occurs. The time series information does not necessarily need to be information that can specify the time, and may be at least information that can specify the time series relationship with other pixel data.

The change information is information indicating the direction of change in the pixel value. Specifically, the change information is information in which the increase and decrease of the pixel value are represented by the binary values of 0 and 1. Here, 0 indicates a decrease and 1 indicates an increase, and the opposite may be true. The coordinate information is information indicating the coordinates of the pixel in which the change in the pixel value is occurred, the Y coordinate information indicates the Y coordinate, and the X coordinate information indicates the X coordinate.

An arrangement order of the information included in the pixel data is predetermined. Specifically, in the pixel data output from the sensor 11, the time series information, the change information, the Y coordinate information, and the X coordinate information are arranged in this order. That is, among the information included in the pixel data, the most significant bit (MSB) is assigned to the time series information, and the least significant bit (LSB) is assigned to the X coordinate information.

A predetermined number of bits is assigned to each piece of information included in the pixel data. For example, in the example illustrated in FIG. 3, 32 bits are assigned to the time series information, 4 bits are assigned to the change information, and 14 bits are assigned to the Y coordinate information and the X coordinate information, respectively.

In a case where the pixel data is acquired from the sensor 11, the first processing unit 12 performs the above-described expansion processing, conversion processing, arrangement change processing, and transmission order change processing on the acquired pixel data. The specific contents of these processing will be described later.

The transmission unit 13 transmits the pixel data processed by the first processing unit 12 to the reception device 20 via the transmission line 30.

The storage unit 14 is a storage device such as a memory. The storage unit 14 stores arrangement pattern information, switching pattern information, transmission pattern information, and the like, which will be described later. In addition, the storage unit 14 can temporarily store a plurality of pieces of pixel data.

For example, the first processing unit 12 is realized by an integrated circuit such as an application specific integrated circuit (ASIC) or a field programmable gate array (FPGA). In addition, for example, the first processing unit 12 may be realized by executing various programs stored in the storage device inside the imaging device 10 with the RAM or the like as a work area by a processor such as a central processing unit (CPU) or a micro processing unit (MPU). The same applies to a second processing unit 22 described later.

The reception device 20 is provided with a reception unit 21, a second processing unit 22, a storage unit 23, and a recognition unit 24. The reception unit 21 receives the pixel data from the imaging device 10 via the transmission line 30.

The second processing unit 22 performs a restoration processing for returning the pixel data received by the reception unit 21 to the pixel data before the expansion processing, the conversion processing, the arrangement change processing, and the transmission order change processing are performed. The specific contents of the restoration processing will be described later.

The storage unit 23 is a storage device such as a memory. The storage unit 23 stores the pixel data restored by the second processing unit 22. In addition, the storage unit 23 stores the arrangement pattern information, the switching pattern information, the transmission pattern information, and the like, which will be described later.

For example, the recognition unit 24 generates image data by superimposing a plurality of pieces of pixel data stored in the storage unit 23 and performs image recognition processing based on the generated image data.

Here, an example will be described in which the pixel data after the restoration processing is stored in the storage unit 23 after the restoration processing is performed by the second processing unit 22. Not limited to this, the reception device 20 may store the pixel data received from the imaging device 10 as it is in the storage unit 23, and perform the restoration processing on the pixel data stored in the storage unit 23 when the pixel data is used (in the present embodiment, when the recognition processing is performed by the recognition unit 24) by the second processing unit 22.

3. About Expansion Processing and Conversion Processing

Next, the expansion processing and the conversion processing will be described. First, the contents of the expansion processing will be described with reference to FIG. 4. FIG. 4 is a diagram illustrating an example of expansion processing.

The upper limit of the value of the coordinate information, specifically, the value of the X coordinate information and the value of the Y coordinate information is the vertical and horizontal sizes of the sensor 11. FIG. 4 illustrates an example in which the size of each side of the sensor 11 is less than half the size that can be represented by the number of bits assigned to each side (here, 14 bits each). In such a case, among the bits assigned to the Y coordinate information and the X coordinate information, the high-order bit is normally 0. As a result, a bit fixed to 0 represents in a delimiter portion between the change information and the Y coordinate information and a delimiter portion between the Y coordinate information and the X coordinate information. Therefore, it is easy to estimate the delimiter of change information, Y coordinate information, and X coordinate information.

Therefore, in a case where the first processing unit 12 of the imaging device 10 acquires the pixel data from the sensor 11, the expansion processing is performed to expand each value of the Y coordinate information and the X coordinate information within the range of the number of bits (here, 14 bits) assigned to each information.

Specifically, the first processing unit 12 expands the value of the X coordinate information by multiplying the value of the X coordinate information by the coefficient $\alpha$. For example, the value of the coefficient $\alpha$ is a value obtained by dividing the upper limit value of the value that can be represented by the number of bits (here, 14 bits) assigned to the X coordinate information by the upper limit value of the X coordinate (that is, sensor size) that can be output by the sensor 11. The value of the coefficient $\alpha$ may be a value less than the above value (here, larger than 0).

Similarly, the first processing unit 12 expands the value of the Y coordinate information by multiplying the value of the Y coordinate information by the coefficient $\beta$. For example, the value of the coefficient $\beta$ is a value obtained by dividing the upper limit value of the value that can be represented by the number of bits (here, 14 bits) assigned to the Y coordinate information by the upper limit value of the Y coordinate (that is, sensor size) that can be output by the sensor 11. The value of the coefficient $\beta$ may be a value less than the above value (here, larger than 0).

As described above, the first processing unit 12 generates the expanded X coordinate information using the high-order bits of the bits assigned to the X coordinate information and the expanded Y coordinate information using the high-order bits of the bits assigned to the Y coordinate information.

The values of the X coordinate information and the Y coordinate information are easy to guess because the upper limit is the value of the normal resolution, and can be made irrelevant to the normal resolution value by expanding the values of the X coordinate information and the Y coordinate information by the above expansion processing. As a result, it is possible to make it difficult to estimate that the information is coordinate information. In addition, by using the high-order bits of the bits assigned to the X coordinate information and the Y coordinate information, the bits fixed to 0 are eliminated (or reduced), so that it is possible to make it difficult to estimate the delimiter of each information.

Figures 5, 6:
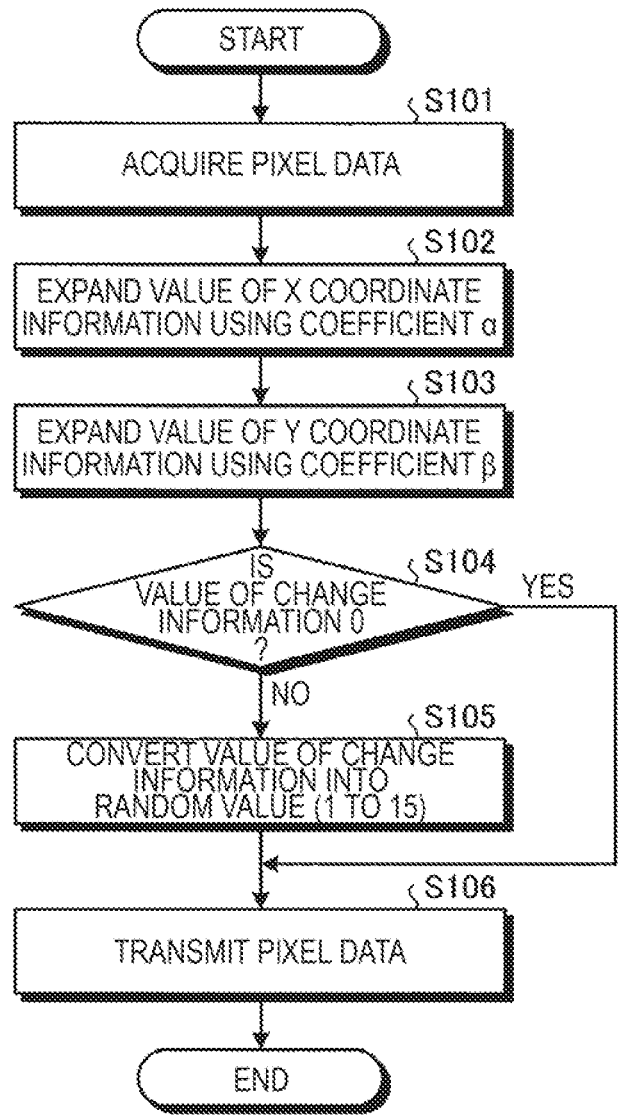
FIG. 5 is a table illustrating an example of conversion processing.
FIG. 6 is a flowchart illustrating an example of a processing procedure of an imaging device in the case of performing the expansion processing and the conversion processing.

Next, the contents of the conversion processing will be described with reference to FIG. 5. FIG. 5 is a table illustrating an example of conversion processing.

As illustrated in FIG. 5, the sensor 11 sets the value of the change information to 0 in a case where the pixel value decreases, and sets the value of the change information to 1 in a case where the pixel value increases. The sensor 11 represents the amount of change in the pixel value depending on the output frequency of the pixel data. That is, for example, in a case where the amount of change in the pixel value is large, the pixel data is output with high frequency, and in a case where the amount of change in the pixel value is small, the pixel data is output with low frequency. The reception device 20 can specify the amount of change in the pixel value based on the output frequency of the pixel data.

As described above, the change information can be represented by the binary values of 0 and 1, that is, 1 bit. On the other hand, the change information is assigned a number of bits of 2 bits or more (here, 4 bits). Therefore, as for the value of the change information, only a specific 1 bit (least significant bit) changes with the binary values of 0 and 1, and the other bits are fixed to 0. Therefore, since a bit fixed to 0 appears in the delimiter portion of the time series information and the change information, it is easy to estimate the delimiter of the time series information and the change information.

Therefore, the first processing unit 12 performs a conversion processing of converting the value of the change information by using extra bits that are not normally used so that the value of the change information takes a value other than the binary values of 0 and 1. Specifically, in a case where the value of the change information included in the pixel data acquired from the sensor 11 is 1, the first processing unit 12 converts the value of the change information (that is, 1) into any value (here, a random value of 1 to 15) that can be represented by the number of bits (here, 4 bits) assigned to the change information. On the other hand, in a case where the value of the change information included in the pixel data acquired from the sensor 11 is 0, the first processing unit 12 does not convert the value and leaves the value at 0.

As described above, by using the extra bits (high-order 3 bits) that are not normally used and are fixed to 0, a value of change information that normally takes only one of 0 and 1 can be represented as a seemingly meaningless random value. As a result, the original feature of the converted information that takes only the binary values of 0 and 1 can be erased, and the contents of the converted information can be difficult to estimate. In addition, it is possible to make it difficult to estimate the delimiter between the time series information and the change information.

Next, the processing procedure in the imaging device 10 and the reception device 20, in a case where the above-described expansion processing and conversion processing are performed will be described. First, the procedure of the processing performed in the imaging device 10 will be described with reference to FIG. 6. FIG. 6 is a flowchart illustrating an example of the processing procedure of the imaging device 10 in the case of performing the expansion processing and the conversion processing.

As illustrated in FIG. 6, when the first processing unit 12 acquires the pixel data from the sensor 11 (Step S101), the value of the X coordinate information included in the acquired pixel data is expanded by using the coefficient α (Step S102), and the value of the Y coordinate information is expanded by using the coefficient β (Step S103). The first processing unit 12 may perform the expansion processing of the X coordinate information after the expansion processing of the Y coordinate information.

Subsequently, the first processing unit 12 determines whether or not the value of the change information acquired from the sensor 11 is 0 (Step S104). In this processing, in a case where the value of the change information is not 0 (Step S104, No), that is, in a case where the value of the change information is 1, the first processing unit 12 converts the value of the change information into a random value within 4 bits (1 to 15) (Step S105).

In a case where the processing of Step S105 is completed, or in a case where the value of the change information is 0 in Step S104 (Step S104, Yes), the first processing unit 12 outputs the pixel data after the expansion processing and the conversion processing to the transmission unit 13, and the transmission unit 13 transmits the pixel data after the expansion processing and the conversion processing to the reception device 20 via the transmission line 30 (Step S106).

Figure 7:
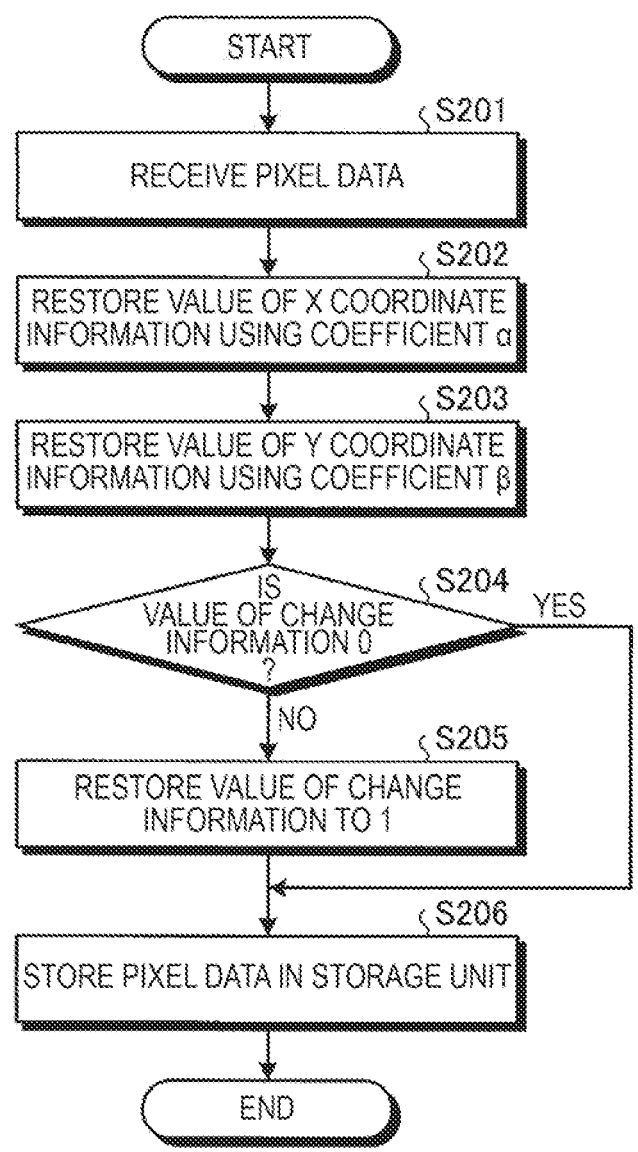
FIG. 7 is a flowchart illustrating an example of a processing procedure of a reception device in the case of performing the expansion processing and the conversion processing.

Next, the procedure of the processing in the reception device 20 will be described with reference to FIG. 7. FIG. 7 is a flowchart illustrating an example of the processing procedure of the reception device 20 in the case of performing the expansion processing and the conversion processing.

As illustrated in FIG. 7, the reception unit 21 receives the pixel data (Step S201). Subsequently, the second processing unit 22 restores the value of the X coordinate information included in the received pixel data using the coefficient α (Step S202), and restores the value of the Y coordinate information using the coefficient β (Step S203). Specifically, the coefficients α and β are stored in advance in the storage unit 23 of the reception device 20, and the second processing unit 22 restores the value of the X coordinate information by dividing the value of the X coordinate information by the coefficient α, and restores the value of the Y coordinate information by dividing the value of the Y coordinate information by the coefficient β. The second processing unit 22 may perform the restoration processing of the X coordinate information after the restoration processing of the Y coordinate information.

Subsequently, the second processing unit 22 determines whether or not the value of the change information included in the received pixel data is 0 (Step S204). In this processing, in a case where the value of the change information is not 0 (Step S204, No), the second processing unit 22 restores the value of the change information to 1 (Step S205).

In a case where the processing of Step S205 is completed, or in a case where the value of the change information is 0 in Step S204 (Step S204, Yes), the second processing unit 22 stores the pixel data after the restoration processing in the storage unit 23 (Step S206).

The reception device 20 stores the pixel data received from the imaging device 10 as it is in the storage unit 23, and may take out the pixel data from the storage unit 23 and perform the restoration processing, for example, in a case where performing image recognition processing by the recognition unit 24. In this manner, it is possible to ensure security in a case where unauthorized access to the storage unit 23 is performed.

4. About Arrangement Change Processing

Next, an arrangement change processing for changing the arrangement of a plurality of pieces of information included in the pixel data will be described. FIG. 8 is a table illustrating an example of arrangement pattern information. FIG. 9 is a table illustrating an example of a switching pattern.

The arrangement pattern information and the switching pattern information illustrated in FIG. 8 are stored in advance in the storage unit 14 of the imaging device 10 and the storage unit 23 of the reception device 20.

As illustrated in FIG. 8, the arrangement pattern information is information in which a plurality of arrangement patterns that define the arrangement order of the time series information, the change information, the Y coordinate information, and the X coordinate information included in the pixel data, and an identification number that identifies each arrangement pattern are associated with each other.

For example, the arrangement pattern associated with the identification number A defines the arrangement order of the time series information, the X coordinate information, the change information, and the Y coordinate information. In addition, the arrangement pattern of the identification number B defines the arrangement order of the time series information, the change information, the X coordinate information, and the Y coordinate information.

As illustrated in FIG. 9, the switching pattern is information in which a plurality of switching patterns that define the switching order of the arrangement patterns used in the arrangement change processing by the first processing unit 12 and an identification number that identifies each switching pattern are associated with each other.

For example, the switching pattern associated with the identification number 1 defines that the arrangement pattern is switched in the order of A→B→C→D→E→F→G→H. In addition, the switching pattern associated with the identification number 2 defines that the arrangement pattern is switched in the order of B→A→D→C→H→G→F→E.

Figure 10:
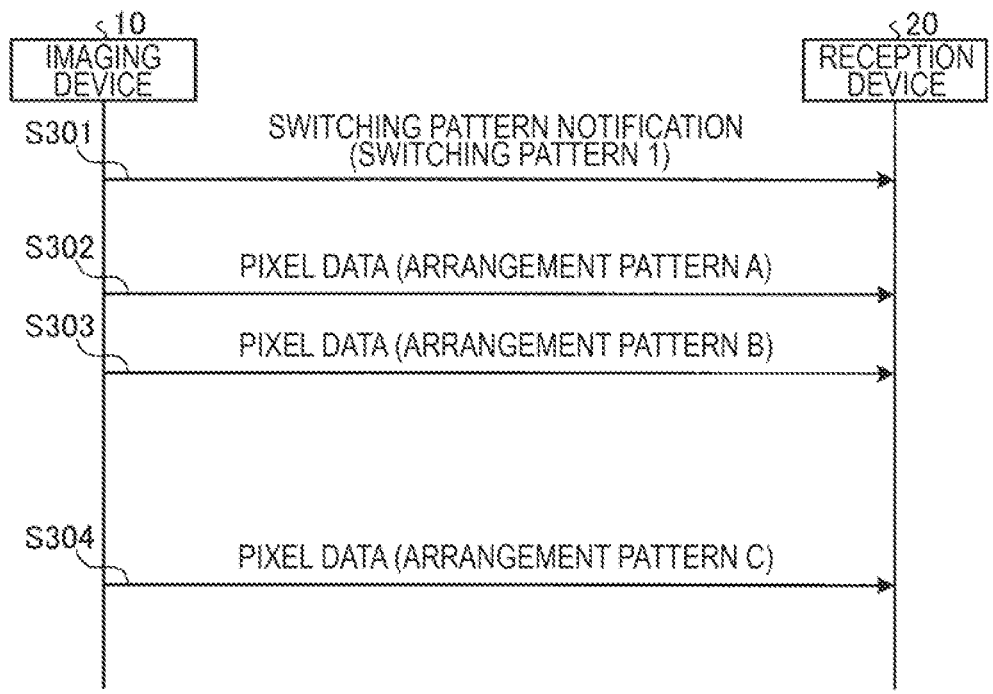
FIG. 10 is a sequence diagram illustrating an example of the pixel data output from the imaging device in the case of performing arrangement change processing.

Next, the contents of the pixel data output from the imaging device 10 in a case where the arrangement change processing is performed will be described with reference to FIG. 10. FIG. 10 is a sequence diagram illustrating an example of the pixel data output from the imaging device 10 in the case of performing the arrangement change processing.

As illustrated in FIG. 10, the imaging device 10 notifies the reception device 20 of the identification number of the switching pattern to be used this time via the transmission line 30 in, for example, the initial processing performed when starting communication with the reception device 20 (Step S301). Here, it is assumed that the switching pattern of the identification number 1 is used.

Subsequently, the imaging device 10 rearranges the first pixel data into the arrangement pattern A to transmit the first pixel data to the reception device 20. Subsequently, the imaging device 10 rearranges the next pixel data into the arrangement pattern B to transmit the next pixel data into the reception device 20, rearranges the next pixel data into the arrangement pattern C to transmit the next pixel data to the reception device 20, and rearranges the next pixel data into the arrangement pattern D to transmit the next pixel data to the reception device 20.

As described above, the imaging device 10 rearranges each information included in the pixel data into an arrangement pattern different from the predetermined arrangement order to transmit the information to the reception device 20. As a result, it is possible to eliminate the feature of pixel data that "each information included in pixel data is normally arranged in the same order". That is, even when there is a bit fixed to 0, it is possible to make it difficult to estimate the delimiter between each pieces of information by changing the position of the bit fixed to 0. In addition, since the size of the data varies again, it is possible to make it difficult to analyze by unauthorized access such as side channel attack. Therefore, security can be improved.

In addition, the imaging device 10 can further improve the security by switching the arrangement pattern in the switching order according to the switching pattern each time the pixel data is transmitted.

The imaging device 10 can hide not only the change information and the coordinate information but also the feature of the time series information by combining the above-described expansion processing and the conversion processing with the arrangement change processing. That is, since all the information included in the pixel data can be hidden, the security can be further improved.

Figure 11:
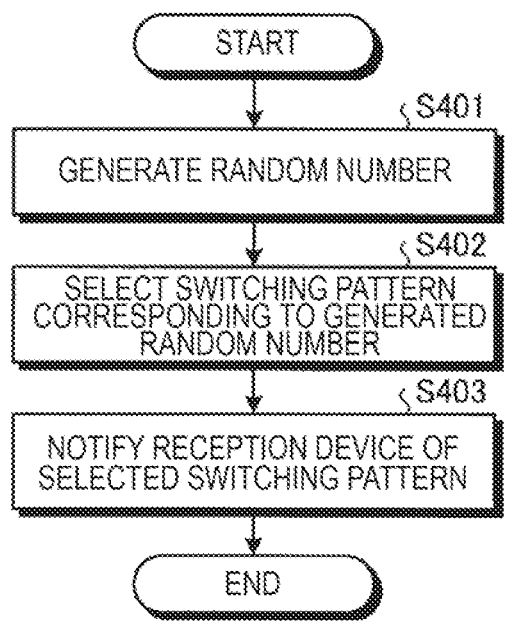
FIG. 11 is a flowchart illustrating an example of a procedure of switching pattern notification processing.

Next, the procedure of the processing in the imaging device 10 in a case where the arrangement change processing is performed will be described with reference to FIGS. 11 and 12. First, switching pattern notification processing will be described with reference to FIG. 11. FIG. 11 is a flowchart illustrating an example of a procedure of the switching pattern notification processing.

As illustrated in FIG. 11, the first processing unit 12 of the imaging device 10 generates a random number using, for example, a random number generator (Step S401). For example, as illustrated in FIG. 9, in a case where eight types of switching patterns exist, any number from 1 to 8 is generated.

Subsequently, the first processing unit 12 selects the switching pattern corresponding to the generated random number as the switching pattern to be used this time (Step S402). For example, in a case where 1 is generated in Step S401, the first processing unit 12 selects a switching pattern corresponding to 1, for example, a switching pattern of identification number 1.

The transmission unit 13 notifies the reception device 20 of the selected switching pattern via the transmission line 30 (Step S403).

Next, arrangement change processing will be described with reference to FIG. 12. FIG. 12 is a flowchart illustrating an example of a procedure of the arrangement change processing.

Figure 12:
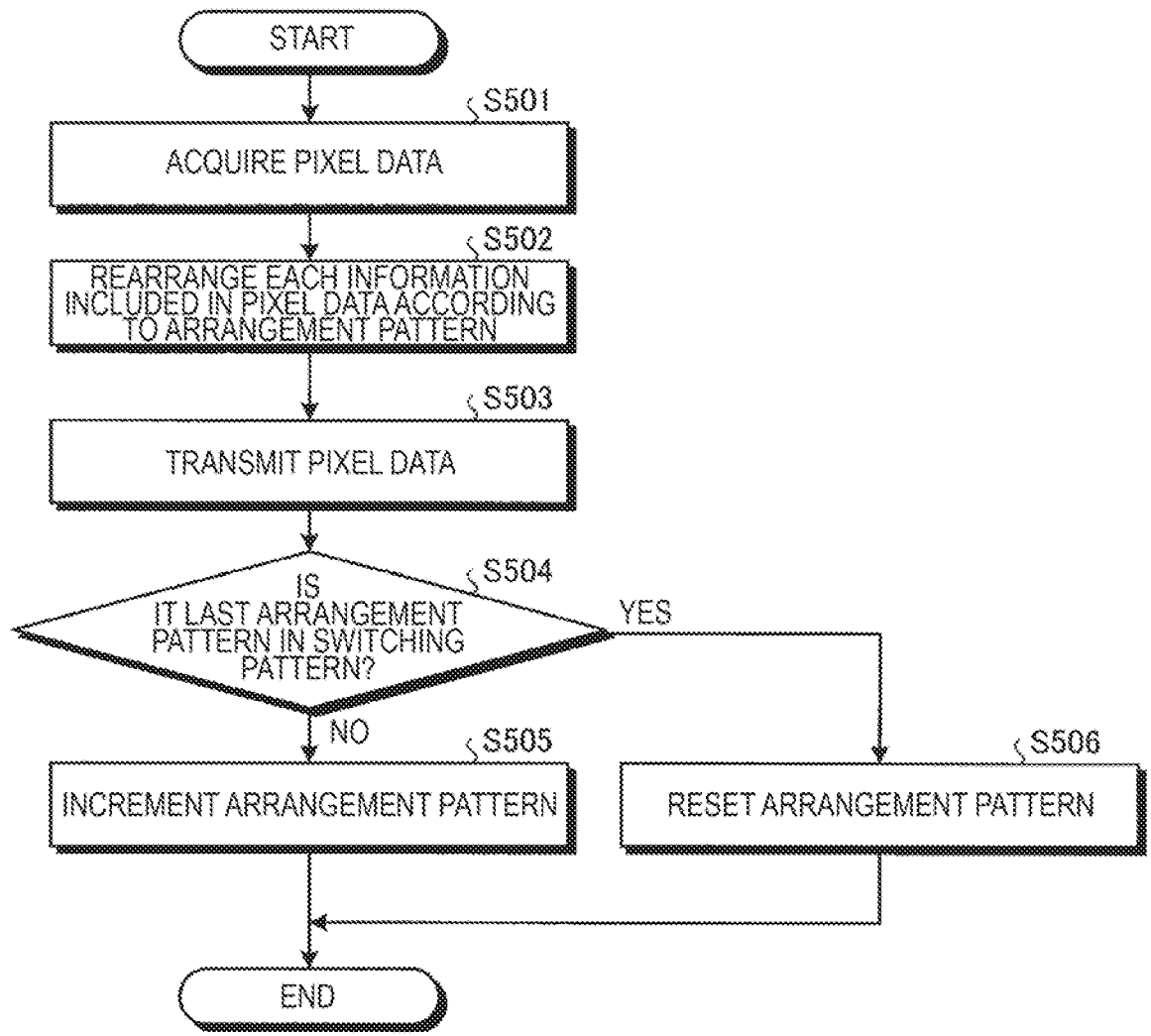
FIG. 12 is a flowchart illustrating an example of a procedure of the arrangement change processing.

As illustrated in FIG. 12, when the first processing unit 12 acquires the pixel data from the sensor 11 (Step S501), each information included in the acquired pixel data is rearranged according to an arrangement pattern (Step S502). The transmission unit 13 transmits the rearranged pixel data to the reception device 20 via the transmission line 30 (Step S503).

Subsequently, the first processing unit 12 determines whether or not the arrangement pattern used this time is the last arrangement pattern in the switching pattern selected in Step S402 (refer to FIG. 11) (Step S504). For example, in a case where the switching pattern 1 is selected, since the last arrangement pattern is the arrangement pattern of the identification number H, the first processing unit 12 determines whether or not the arrangement pattern used this time is the arrangement pattern of the identification number H.

In this processing, in a case where the arrangement pattern used this time is not the last arrangement pattern in the switching pattern (Step S504, No), the first processing unit 12 increments the arrangement pattern to be used (Step S505). For example, in a case where the switching pattern 1 is selected and the arrangement pattern A is used, the first processing unit 12 increments the arrangement pattern so that the arrangement pattern B is used in the next arrangement change processing.

On the other hand, in a case where the arrangement pattern used this time is the last arrangement pattern in the switching pattern (Step S504, Yes), the first processing unit 12 resets the arrangement pattern to be used (Step S506). For example, in a case where the switching pattern 1 is selected and the arrangement pattern H is used, the first processing unit 12 resets the arrangement pattern so that the arrangement pattern A is used in the next arrangement change processing.

Figure 13:
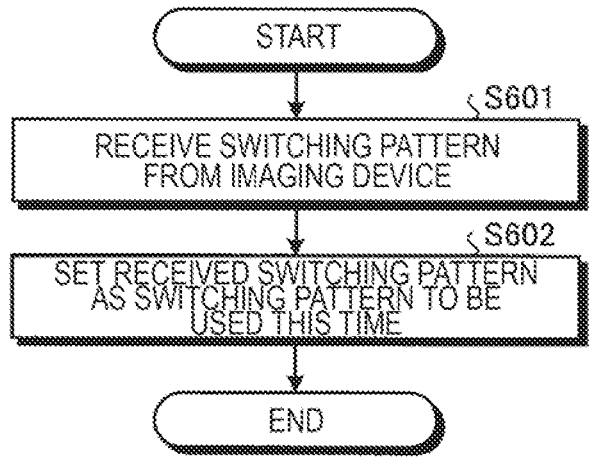
FIG. 13 is a flowchart illustrating an example of a procedure of switching pattern setting processing.

Next, the procedure of the processing in the reception device 20 in a case where the arrangement change processing is performed will be described. First, switching pattern setting processing will be described with reference to FIG. 13. FIG. 13 is a flowchart illustrating an example of a procedure of the switching pattern setting processing.

As illustrated in FIG. 13, the reception unit 21 of the reception device 20 receives the switching pattern from the imaging device 10 (Step S601). Subsequently, the second processing unit 22 sets the received switching pattern as the switching pattern to be used this time (Step S602).

Next, a procedure of restoration processing will be described with reference to FIG. 14. FIG. 14 is a diagram illustrating an example of the procedure of the restoration processing corresponding to the arrangement change processing.

As illustrated in FIG. 14, the reception unit 21 of the reception device 20 receives pixel data from the imaging device 10 (Step S701). Subsequently, the second processing unit 22 restores the arrangement order of each information included in the pixel data based on the arrangement pattern used this time (Step S702). That is, the second processing unit 22 returns the arrangement order of each information included in the pixel data to a predetermined arrangement order from the arrangement order of the arrangement pattern used this time. Subsequently, the second processing unit 22 stores the restored pixel data in the storage unit 23 (Step S703).

Subsequently, the second processing unit 22 determines whether or not the arrangement pattern used this time is the last arrangement pattern in the switching pattern set in Step S602 (refer to FIG. 13) (Step S704). In this processing, in a case where the arrangement pattern used this time is not the last arrangement pattern in the switching pattern (Step S704, No), the second processing unit 22 increments the arrangement pattern to be used (Step S705). On the other hand, in a case where the arrangement pattern used this time is the last arrangement pattern in the switching pattern (Step S704, Yes), the second processing unit 22 resets the arrangement pattern to be used (Step S706).

Here, although the switching pattern is notified from the imaging device 10 to the reception device 20, this disclosure is not limited thereto, and the switching pattern may be notified from the reception device 20 to the imaging device 10.

In addition, the reception device 20 stores the pixel data received from the imaging device 10 as it is in the storage unit 23, and may take out the pixel data from the storage unit 23 to perform the restoration processing, for example, in a case where the recognition unit 24 performs the image recognition processing or the like. In this manner, it is possible to ensure security in a case where unauthorized access to the storage unit 23 is performed.

5. About Transmission Order Change Processing

Next, transmission order change processing will be described. FIG. 15 is a table illustrating an example of transmission pattern information.

The transmission pattern information illustrated in FIG. 15 is stored in advance in the storage unit 14 of the imaging device 10 and the storage unit 23 of the reception device 20.

As illustrated in FIG. 15, the transmission pattern information is information in which a plurality of transmission patterns that define a transmission order of a plurality of pixels (here, six) to the reception device 20 are associated with an identification number that identifies each transmission pattern.

t0 to t5 illustrated in FIG. 15 represent the time series order of the six pixel data, represent that the pixel data of t0 is the pixel data output from the sensor 11 earliest in time series among the six pixel data, and represent that the pixel data of t5 is the pixel data output from the sensor 11 latest in time series among the six pixel data. Therefore, when the pixel data of t0 to t5 are arranged in the time series order, it is t0→t1→t2→t3→t4→t5.

For example, the transmission pattern associated with the identification number a defines that the pixel data of t0 to t5 is transmitted in the order of t2→t0→t4→t1→t3→t5. In addition, the transmission pattern associated with the identification number b defines that the pixel data of t0 to t5 is transmitted in the order of t4→t2→t3→t5→t1→t0.

The pixel data generated by the sensor 11 is normally transmitted from the imaging device 10 in the time series order. That is, the pixel data of t0 to t5 is normally transmitted in the order of t0→t1→t2→t3→t4→t5. The transmission order change processing changes the transmission order of the pixel data to an order other than the time series order based on the transmission pattern.

Figure 16:
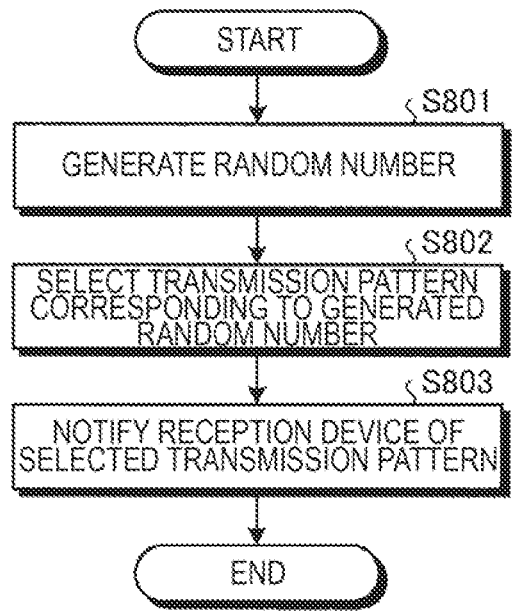
FIG. 16 is a flowchart illustrating an example of a procedure of transmission pattern notification processing.

Next, the procedure of the processing in the imaging device 10 in a case where the transmission order change processing is performed will be described with reference to FIGS. 16 and 17. First, transmission pattern notification processing will be described with reference to FIG. 16. FIG. 16 is a flowchart illustrating an example of a procedure of the transmission pattern notification processing.

As illustrated in FIG. 16, the first processing unit 12 of the imaging device 10 generates a random number using, for example, a random number generator (Step S801). For example, as illustrated in FIG. 15, in a case where three types of switching patterns exist, any number from 1 to 3 is generated.

Subsequently, the first processing unit 12 selects the transmission pattern corresponding to the generated random number as the transmission pattern to be used this time (Step S802). For example, in a case where 1 is generated in Step S801, the first processing unit 12 selects a transmission pattern corresponding to 1, for example, a transmission pattern having the identification number a.

The transmission unit 13 notifies the reception device 20 of the selected transmission pattern via the transmission line 30 (Step S803).

Next, transmission order change processing will be described with reference to FIG. 17. FIG. 17 is a flowchart illustrating an example of a procedure of the transmission order change processing.

Figure 17:
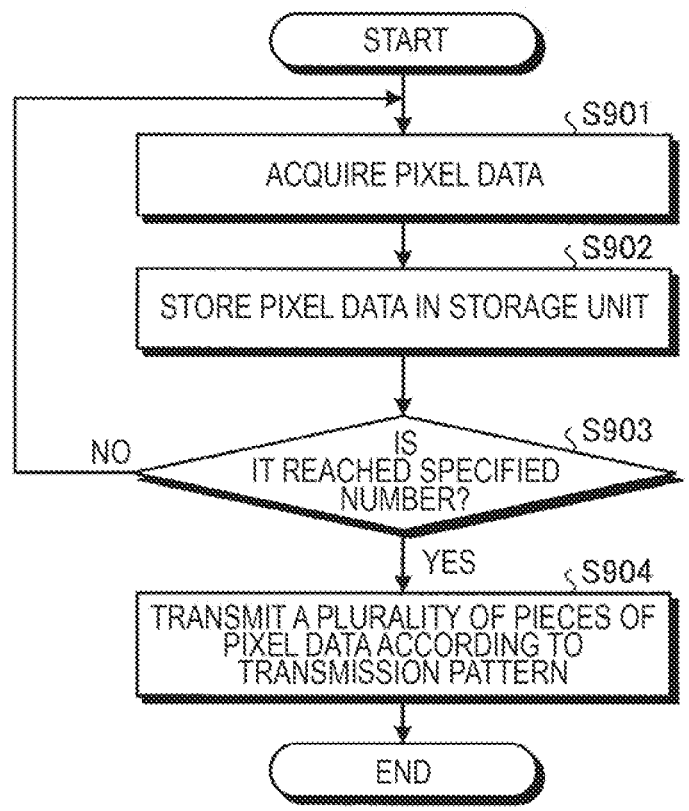
FIG. 17 is a flowchart illustrating an example of a procedure of transmission order change processing.

As illustrated in FIG. 17, when pixel data is acquired from the sensor 11 (Step S901), the first processing unit 12 stores the acquired pixel data in the storage unit 14 (Step S902).

Subsequently, the first processing unit 12 determines whether or not the number of pixel data stored in the storage unit 14 is reached a predetermined specified number. In this processing, in a case where the specified number is not reached (Step S903, No), the first processing unit 12 returns the processing to Step S901, and repeats the processing of Steps S901 to S903 until the specified number is reached.

On the other hand, in Step S903, in a case where the number of pixel data stored in the storage unit 14 reaches a predetermined specified number (Step S903, Yes), the transmission unit 13 sequentially transmits the plurality of pieces of pixel data stored in the storage unit to the reception device 20 via the transmission line 30 in the transmission order defined by the transmission pattern selected in Step S802 (refer to FIG. 16) (Step S904).

In a case where the pixel data is stored in the storage unit 14 in Step S902, the first processing unit 12 may store the pixel data at a storage position corresponding to the transmission order of the pixel data defined by the transmission pattern. As a result, in Step S904, the transmission unit 13 can transmit the plurality of pieces of pixel data stored in the storage unit 14 in the transmission order defined by the transmission pattern.

In addition, the first processing unit 12 may store the pixel data in the time series order in Step S902. In this case, in a case of transmitting the plurality of pieces of pixel data in Step S904, the first processing unit 12 may rearrange the plurality of pieces of pixel data in the transmission order defined by the transmission pattern.

Incidentally, for example, in a case where there is substantially no change in the pixel value, in Step S902, the number of pixel data stored in the storage unit 14 does not easily reach the specified number and it may take a long time to transmit the pixel data in Step S902. Therefore, for example, the first processing unit 12 measures the elapsed time from acquiring the first pixel data of the specified number in Step S901, and in a case where the elapsed time exceeds the threshold value, the processing may proceed to Step S904, and the pixel data less than the specified number stored in the storage unit 14 may be transmitted to the reception device 20. In addition, the first processing unit 12 may discard less than a specified number of pixel data stored in the storage unit 14, in a case where the elapsed time exceeds the threshold value.

Figure 18:
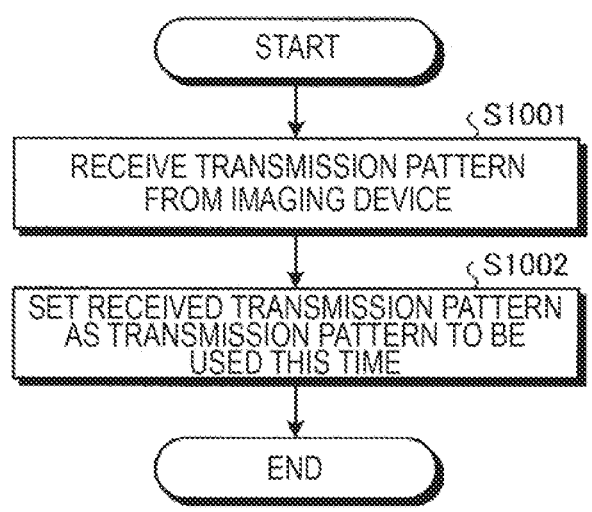
FIG. 18 is a flowchart illustrating an example of a procedure of transmission pattern setting processing.

Next, the procedure of the processing in the reception device 20 in a case where the transmission order change processing is performed will be described. First, transmission pattern setting processing will be described with reference to FIG. 18. FIG. 18 is a flowchart illustrating an example of a procedure of the transmission pattern setting processing.

As illustrated in FIG. 18, the reception unit 21 of the reception device 20 receives the transmission pattern from the imaging device 10 (Step S1001). Subsequently, the second processing unit 22 sets the received transmission pattern as the transmission pattern to be used this time (Step S1002).

Figure 19:
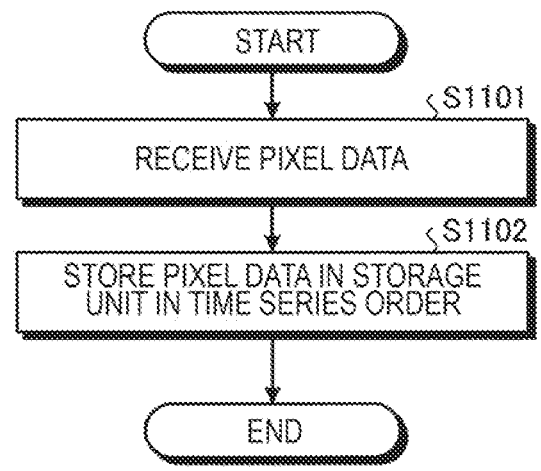
FIG. 19 is a flowchart illustrating an example of a procedure of restoration processing corresponding to the transmission order change processing.

Next, a procedure of restoration processing will be described with reference to FIG. 19. FIG. 19 is a diagram illustrating an example of a procedure of the restoration processing corresponding to the transmission order change processing.

As illustrated in FIG. 19, the reception unit 21 of the reception device 20 receives pixel data from the imaging device 10 (Step S1101). Subsequently, the second processing unit 22 stores the received pixel data in the storage unit 23 in the time series order. For example, the second processing unit 22 specifies which pixel data the received pixel data is in the time series order based on the transmission pattern set in Step S1002 (refer to FIG. 18). The second processing unit 22 stores the pixel data at the storage positions corresponding to the specified order.

As described above, by changing the transmission order of the plurality of pieces of pixel data to a different order from the time series order, the feature of the pixel data that "the transmission order of the pixel data matches the time series order" can be eliminated. As a result, it is difficult to estimate that the information is increasing (for example, some count value not limited to the time series information) such as the time series information, so that the security can be improved.

The second processing unit 22 stores the received pixel data as it is in the storage unit 23, and may perform the restoration processing of taking out a plurality of pieces of pixel data from the storage unit 23 to rearrange the plurality of pieces of pixel data in the time series order, for example, in a case where the recognition unit 24 performs the image recognition processing. In this manner, it is possible to ensure security in a case where unauthorized access to the storage unit 23 is performed.

The imaging device 10 may combine the transmission order change processing with respect to the expansion processing, the conversion processing, and the arrangement change processing described above. As a result, security can be further improved.

In the above-described embodiment, although the event driven sensor is described as an example, the present disclosure is applicable not only to the event driven sensor but also to a sensor that asynchronously outputs detection data including time series information. Examples of such a sensor include a sonar that detects information on an object using sound waves and a radar that detects information on an object using radio waves.

As described above, the sensor system (sensor system 1 as an example) according to the embodiment is provided with the transmission device (imaging device 10 as an example) and the reception device (reception device 20 as an example). The transmission device has a sensor (sensor 11 as an example) that asynchronously outputs detection data (pixel data as an example) including time series information. The reception device is connected to the transmission device via a transmission line (transmission line 30 as an example). In addition, the detection data includes coordinate information (X coordinate information and Y coordinate information as an example). In addition, the transmission device is provided with the expansion unit (first processing unit 12 as an example) and the transmission unit (transmission unit 13 as an example). The expansion unit expands the value of the coordinate information within the range of the number of bits assigned to the coordinate information, in a case where the detection data is acquired from the sensor. The transmission unit transmits expanded detection data (pixel data after the expansion processing as an example) in which the value of the coordinate information is expanded by the expansion unit to the reception device via the transmission line. Therefore, as an example, it is possible to eliminate the feature that "there is a bit that normally takes a specific value". Therefore, security can be improved.

In the above sensor system, as an example, the expansion unit expands the value of the coordinate information by multiplying the value of the coordinate information by coefficients (coefficients α and β as an example) equal to or less than a value obtained by dividing an upper limit value of a value that is able to be represented by the number of bits assigned to the coordinate information by an upper limit value of a coordinate that is able to be output by the sensor. In addition, the reception device is provided with the restoration unit (second processing unit 22 as an example). The restoration unit may divide the value of the coordinate information included in the received expanded detection data by a coefficient, in a case where the expanded detection data is received from the transmission device. Therefore, as an example, by using the high-order bits of the bits assigned to the coordinate information, the bits fixed to 0 are eliminated (or reduced), so that it is possible to make it difficult to estimate the delimiter of each information included in the detection data. Therefore, security can be improved.

In the above sensor system, as an example, the detection data further includes change information to which a number of bits of 2 bits or more is assigned, and in which an increase and a decrease are represented by binary values of 0 and 1. In addition, the transmission device is provided with the conversion unit (first processing unit 12 as an example). The conversion unit may convert a value into any value that is able to be represented by the number of bits assigned to the change information, in a case where a value of the change information included in the detection data is 1. Therefore, as an example, it is possible to eliminate the feature that "a specific bit normally takes the binary values (0 or 1)". Therefore, security can be improved.

In the above sensor system, as an example, the detection data includes a plurality of pieces of information including the time series information (time series information, change information, Y coordinate information, and X coordinate information as an example) in a predetermined arrangement order. In addition, the transmission device is provided with the arrangement change unit (first processing unit 12 as an example). The arrangement change unit may change an arrangement order of a plurality of pieces of information included in acquired detection data according to a predetermined arrangement pattern, in a case where the detection data is acquired from the sensor. Therefore, as an example, it is possible to eliminate the feature that "each information included in the detection data is normally arranged in the same order". Therefore, security can be improved.

In the sensor system, as an example, the transmission device is provided with the storage unit (storage unit 14 as an example) and the transmission order change unit (first processing unit 12 as an example). The storage unit may store a plurality of pieces of the detection data. The transmission order change unit may change a transmission order of the plurality of pieces of detection data to an order different from a time series order. Therefore, as an example, it is possible to eliminate the feature that "the transmission order of the detection data matches the time series order". Therefore, security can be improved.

Hereinbefore, although the embodiments of the present disclosure is illustrated, the above-described embodiments and modifications are merely examples, and the scope of the invention is not intended to be limited. The above-described embodiment and modification can be implemented in various other forms, and various omissions, replacements, combinations, and changes can be made without departing from the gist of the invention. In addition, the configuration and shape of each embodiment and each modification can be partially replaced.

A sensor system according to an aspect of the present disclosure includes a transmission device and a reception device as an example. The transmission device includes a sensor that asynchronously outputs detection data including time series information. The reception device is connected to the transmission device via a transmission line. In addition, the detection data includes coordinate information. In addition, the transmission device is provided with an expansion unit and a transmission unit. The expansion unit is configured to expand a value of the coordinate information within a range of the number of bits assigned to the coordinate information, in a case where the detection data is acquired from the sensor. The transmission unit is configured to transmit expanded detection data in which the value of the coordinate information is expanded by the expansion unit to the reception device via the transmission line. Therefore, as an example, it is possible to eliminate the feature that "there is a bit that normally takes a specific value". Therefore, security can be improved.

In the above sensor system, as an example, the expansion unit may expand the value of the coordinate information by multiplying the value of the coordinate information by a coefficient equal to or less than a value obtained by dividing an upper limit value of a value that is able to be represented by the number of bits assigned to the coordinate information by an upper limit value of a coordinate that is able to be output by the sensor. In addition, the reception device may be provided with a restoration unit. The restoration unit may divide the value of the coordinate information included in received expanded detection data by a coefficient, in a case where the expanded detection data is received from the transmission device. Therefore, as an example, by using the high-order bits of the bits assigned to the coordinate information, the bits fixed to 0 are eliminated (or reduced), so that it is possible to make it difficult to estimate the delimiter of each information included in the detection data. Therefore, security can be improved.

In the above sensor system, as an example, the detection data further may include change information to which the number of bits of 2 bits or more is assigned, and in which an increase and a decrease are represented by binary values of 0 and 1. In addition, the transmission device may be provided with a conversion unit. The conversion unit may convert, in a case where a value of the change information included in the detection data is 1, the value into any value that is able to be represented by the number of bits assigned to the change information. Therefore, as an example, it is possible to eliminate the feature that "a specific bit normally takes the binary values (0 or 1)". Therefore, security can be improved.

In the above sensor system, as an example, the detection data may include a plurality of pieces of information including the time series information in a predetermined arrangement order. In addition, the transmission device may be provided with an arrangement change unit. The arrangement change unit may change an arrangement order of a plurality of pieces of information included in acquired detection data according to a predetermined arrangement pattern, in a case where the detection data is acquired from the sensor. Therefore, as an example, it is possible to eliminate the feature that "each information included in the detection data is normally arranged in the same order". Therefore, security can be improved.

In the above sensor system, as an example, the transmission device may be provided with a storage unit and a transmission order change unit. The storage unit may store a plurality of pieces of the detection data. The transmission order change unit may change a transmission order of the plurality of pieces of detection data to an order different from a time series order. Therefore, as an example, it is possible to eliminate the feature that "the transmission order of the detection data matches the time series order". Therefore, security can be improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sensor system comprising:
a transmission device that includes a sensor which asynchronously outputs detection data including time series information; and
a reception device connected to the transmission device via a transmission line, wherein
the detection data includes coordinate information, and
the transmission device includes
an expansion unit configured to expand a value of the coordinate information within a range of the number of bits assigned to the coordinate information, in a case where the detection data is acquired from the sensor, and
a transmission unit configured to transmit expanded detection data in which the value of the coordinate information is expanded by the expansion unit to the reception device via the transmission line.

2. The sensor system according to claim 1, wherein
the expansion unit expands the value of the coordinate information by multiplying the value of the coordinate information by a coefficient equal to or less than a value obtained by dividing an upper limit value of a value that is able to be represented by the number of bits assigned to the coordinate information by an upper limit value of a coordinate that is able to be output by the sensor, and
the reception device includes
a restoration unit configured to divide the value of the coordinate information included in received expanded detection data by the coefficient, in a case where the expanded detection data is received from the transmission device.

3. The sensor system according to claim 1, wherein
the detection data further includes change information to which the number of bits of 2 bits or more is assigned, and in which an increase and a decrease are represented by binary values of 0 and 1, and
the transmission device includes
a conversion unit configured to, in a case where a value of the change information included in the detection data is 1, convert the value into any value that is able to be represented by the number of bits assigned to the change information.

4. The sensor system according to claim 1, wherein
the detection data includes a plurality of pieces of information including the time series information in a predetermined arrangement order, and
the transmission device includes
an arrangement change unit configured to change an arrangement order of a plurality of pieces of information included in acquired detection data according to a predetermined arrangement pattern, in a case where the detection data is acquired from the sensor.

5. The sensor system according to claim 1, wherein
the transmission device includes
a storage unit configured to store a plurality of pieces of the detection data, and
a transmission order change unit configured to change a transmission order of the plurality of pieces of the detection data to an order different from a time series order.

* * * * *